United States Patent [19]
van Gelder

[11] 4,214,887
[45] Jul. 29, 1980

[54] SEWAGE AND WASTE WATER TREATMENT

[75] Inventor: Arthur van Gelder, San Diego, Calif.

[73] Assignee: Ozodyne, Inc., San Diego, Calif.

[21] Appl. No.: 958,741

[22] Filed: Nov. 8, 1978

Related U.S. Application Data

[63] Continuation-in-part of Ser. No. 829,917, Sep. 1, 1977, abandoned.

[51] Int. Cl.² ............................. C05F 7/00; C02B 3/08
[52] U.S. Cl. ........................................ 71/9; 210/63 Z; 210/10; 210/12
[58] Field of Search .................................. 210/2-6, 210/8, 9, 10, 11, 12, 15, 16, 18, 63 R, 63 Z, 65-67, 70, 73 S, 71, 42 R, 49, 50, 512 M; 71/9, 10, 13, 11, 12; 261/78 A, DIG. 42

[56] References Cited

U.S. PATENT DOCUMENTS

| | | | |
|---|---|---|---|
| 1,907,691 | 5/1933 | Wait | 210/63 Z |
| 2,929,688 | 3/1960 | Riker et al. | 71/9 |
| 3,276,994 | 10/1966 | Andrews | 210/63 Z |
| 3,533,775 | 10/1970 | Brown | 71/13 |
| 3,775,314 | 11/1973 | Beitzel et al. | 210/63 Z |
| 3,838,199 | 9/1974 | Coe et al. | 210/2 |
| 3,989,628 | 11/1976 | Bier | 210/73 S |
| 4,038,180 | 7/1977 | Talbert | 210/10 |
| 4,053,399 | 10/1977 | Donnelly et al. | 210/63 Z |
| 4,128,477 | 12/1978 | Nebolsine | 210/63 Z |

FOREIGN PATENT DOCUMENTS

| | | | |
|---|---|---|---|
| 2546756 | 4/1977 | Fed. Rep. of Germany | 210/63 Z |
| 49-49456 | 5/1974 | Japan | 210/63 Z |

*Primary Examiner*—Benoit Castel
*Attorney, Agent, or Firm*—Bruno J. Verbeck

[57] ABSTRACT

This sewage and waste water treatment introduces a different approach to the usual biological digestion of organic solids and sterilization thereof in the effluent. It proceeds from the concept that all sediments and suspended solids to 20 microns or less are removed immediately and continuously from the in-flow, and the almost suspended solid-free flow therefrom is treated in a unique manner with ozone so as to react chemically with the dissolved and remaining suspended solids by oxidation to produce precipitations, gasifications and sterilization which in turn are removed immediately and continuously to 5 microns or less, thus greatly reducing the ozone requirements for the oxidation reactions. The liquid effluent discharged from this process is a clear and sterilized liquid having no contaminants harmful to biological life.

The process also includes the treatment of the removed solids from sewage with ozone to produce a completely deodorized and sterile product without the requirement of substantial chemical oxidation reactions, thereby reducing the ozone demand, and further treatment of the solids in such a manner so as to produce useful dry commercial fertilizers containing a maximum amount of non-pathogenic soil microorganisms required to sustain plant life.

The steps herein are performed largely by existing equipment of proven ability with a minimum of moving parts. The ozone treating method can be applied to liquids and liquids containing a substantial amount of suspended solids in comparatively large and varied particulated sizes.

8 Claims, 6 Drawing Figures

SEWAGE AND WASTE WATER TREATMENT

This application is a continuation-in-part of applicant's co-pending application, Ser. No. 829,917 filed Sept. 1, 1977 now abandoned.

BACKGROUND OF THE INVENTION

The present biological methods of sewage treatment are very slow depending entirely on the growth of microorganisms and their ability to digest organic matter. The growth of these microorganisms and their digestion ability is dependent on nutritional balance and chemicals in the effluent, and fluctuations can throw the system out of balance causing nonfunction or excessive function. The unpredictability and the slowness of the biological digestive process requires enormous space for holding capacities and large equipment for processing. The ultimate disposal of the sewage sludge is an ever increasing problem. The necessity for a new method of treatment is obvious.

Raw sewage contains a mixture of many kinds of insoluble and soluble solids of organic and inorganic material. The insoluble solids are usually sediments or in suspension. The sediments are mostly inorganic materials such as sand, pebbles, metal particles and also organic materials such as paper, wood, plastics, and the like. The solids in suspension which include colloids, are usually organic material composed of human waste, vegetable matter, oils, grease and the like. The solids in solution are both organic and inorganic containing urine, soaps, salts and other chemicals. Even the water itself which comes from the usual sources such as tap water, wells and rivers, contains from 400 to 800 parts per million (ppm) of total solids. Nearly all of the present processes for handling raw sewage requires minimal treatment of solid waste for disposal purposes and even this is restricted as much as possible to inorganic sediments. All organic suspended solids are treated microbiologically to break down or digest the solid structures to produce soluble chemicals and gases. The solids which are by this means converted into liquid form are fed back into the sewage effluent increasing the total dissolved solids in this liquid.

The federal, state and local government regulations are becoming more stringent regarding the amount of total solids, bacteria and toxics allowed in the effluent as time progresses, and the 1985 standards cannot be met by any of the present systems in operation. The effluent leaving the plant may not have pathogenic microorganisms, and to assure this condition, the effluent is treated with chlorine before release. Chlorine reacts with nitrogen compounds which create chemicals which are extremely toxic to fish and biological life, such as polychlorinated biphenols and amino chlorides which are both toxic and carcinogenic. Potable or drinking water treated with chlorine can form chloroform which is found to be carcinogenic to rats and mice, and the EPA has found chloroform to be present in all United States drinking water supplies.

It should be quite apparent that the present method of raw sewage treatment and the disposal of the effluent does not prevent pollution in the rivers or in the oceans or anywhere the discharge is made, but actually increases the pollution. It appears that the emphasis has been on merely making the visual organic materials disappear from view to the naked eye, and when this has been accomplished, then allowing the transformed liquid to be treated by adding chlorine to destroy the pathogenic organisms which merely create other and additional toxic chemicals which when added to the effluent merely adds to the pollution without removing the actual pollutants.

The treatment of sewage has two facets of great importance. The first is the disposal of a clear effluent without contaminating and destroying biological life cycles. The second is the disposition of the organic sludge resulting from the treatment into a useful by-product.

Because of the now apparent result of the present sewage treatment, it is necessary to accomplish a basic change to the treatment of raw sewage and industrial waste water and its ultimate effluent which would in fact eliminate pollution, make the effluent safe for biological life while at the same time, perhaps, providing a useful by-product for further sustenance of biological plant life on a commercial basis.

SUMMARY OF THE INVENTION

The disclosure herein is directed to the process of treating raw sewage and industrial waste water with particular consideration of the ultimate effluent being a reduction of pollutants rather than an increase of them, which would be, and are, dangerous to all types of biological life. In the accomplishment of this process the treatment herein disclosed encompasses many fundamental objectives. One of these objectives is to remove in the first instance from the raw sewage all sediments and many of the solids in suspension immediately and continuously to a particle size of 20 microns or less (0.0007874 inch).

If the solids were to remain in the total flow, they would react differently with various chemical treatments to no real purpose. For example, it requires from 1 to 1.5 pounds of ozone to react chemically with 1 pound of solids. Accordingly, the less solids, the less ozone will be required for chemical reaction.

It is likewise apparent that where the liquid flow contains particles less than 20 microns, the reaction with chemicals for causing flocculation, precipitations, gasifications and sterilization of colloidal suspensions and dissolved solids work more effectively, with less volume of chemicals required.

It is an important feature of this disclosure that the ozone gas is brought into very intimate contact with the effluent to cause the ozone to dissolve in the effluent and come into intimate contact with the molecules of the solids thereby causing oxidation reactions which change the molecular structures of such solids to cause precipitations, gasifications and sterilization. This intimate contact between the ozone and the effluent to be treated is brought about by premixing the ozone and the liquid to be treated by means of eductors, centrifugal-like pumps and other means of violent aggitation which are not open to the atmosphere, but confined and enclosed in a casing through which the mixture can flow. The mixture of dissolved ozone and ozone gas with the liquid containing oxidizable solids is allowed to flow into a rotating disk or cup (atomizer) with a rim speed of about 22,000 feet per minute placed in an enclosed chamber for the purpose of dispersing the liquid into tiny droplets, like a mist or cloud, which will float downwardly through an ozone filled environment thereby causing greater solubility of the ozone and providing the most intimate contact between the molecules of the solids to be oxidized and the ozone atom.

The liquid with the dissolved ozone is made to accumulate at the bottom end of the chamber to provide a certain retention time for the chemical oxidation reactions to develop fully so as to cause flocculations, precipitations and gasifications. Further intimate contact is provided by the high pressures in the atomizer cup and by impact on the inner surface of the chamber.

The precipitations, flocculations and gases are removed by hydrocyclones to less than 5 microns in particle size, leaving a clear nontoxic and sterilized effluent which will sustain all biological life.

The raw sewage solids containing about 80% effluent are treated with ozone in the same manner as above, but with just sufficient ozone to destroy all living microorganisms with minimal chemical oxidation reaction to the product. This is followed by filtration to separate the liquids leaving a sterilized paste-like solid.

This paste-like sterilized solid may be treated by adding and mixing a specially developed non-pathogenic aerobic microorganism for purposes of composting said solids and breaking them down to a usable organic fertilizer. Added to the paste-like solids is part of the composted and dehydrated end product derived from these solids which causes the resultant material to contain a lesser percentage of moisture and become friable. To enhance the quality of this end product, a small percentage of commercial chemical fertilizer and trace minerals may be added to make the mixture a better standard fertilizer, by means of composting procedure and dehydration. A valuable by-product results from the water solids making the system more economically feasible.

By composting this organic material under specific controlled conditions, the number and variety of soil microorganisms is maximized which provides the plant fertilizer with a large number of microorganisms necessary to plant life, and also feed material for the microorganisms allowing them to grow in a manner in which they are accustomed while, at the same time, acclimatizing the new soil environment to provide plant life with its natural chemical requirements for healthy growth.

Of course it is the ultimate objective of the disclosure herein to treat sewage in such a manner that the effluent has a minimum of total solids, and is non-toxic to biological life, free from all pathogenic and nonpathogenic microorganisms so that the discharge is not a pollutant and will not adversely affect biological life.

The treatment of industrial waste water containing dissolved oxidizable inorganic and organic chemicals with ozone causes oxidation of these chemicals changing their molecular structure to form precipitations of insoluble oxides, and gasifications which are mechanically removed from the system in a concentrated form and can be made disposable in a manner consistent with required standards. The effluent free from these chemicals can be reused or allowed to enter any sewage system.

DESCRIPTION OF THE PREFERRED EMBODIMENT

Figure 1:
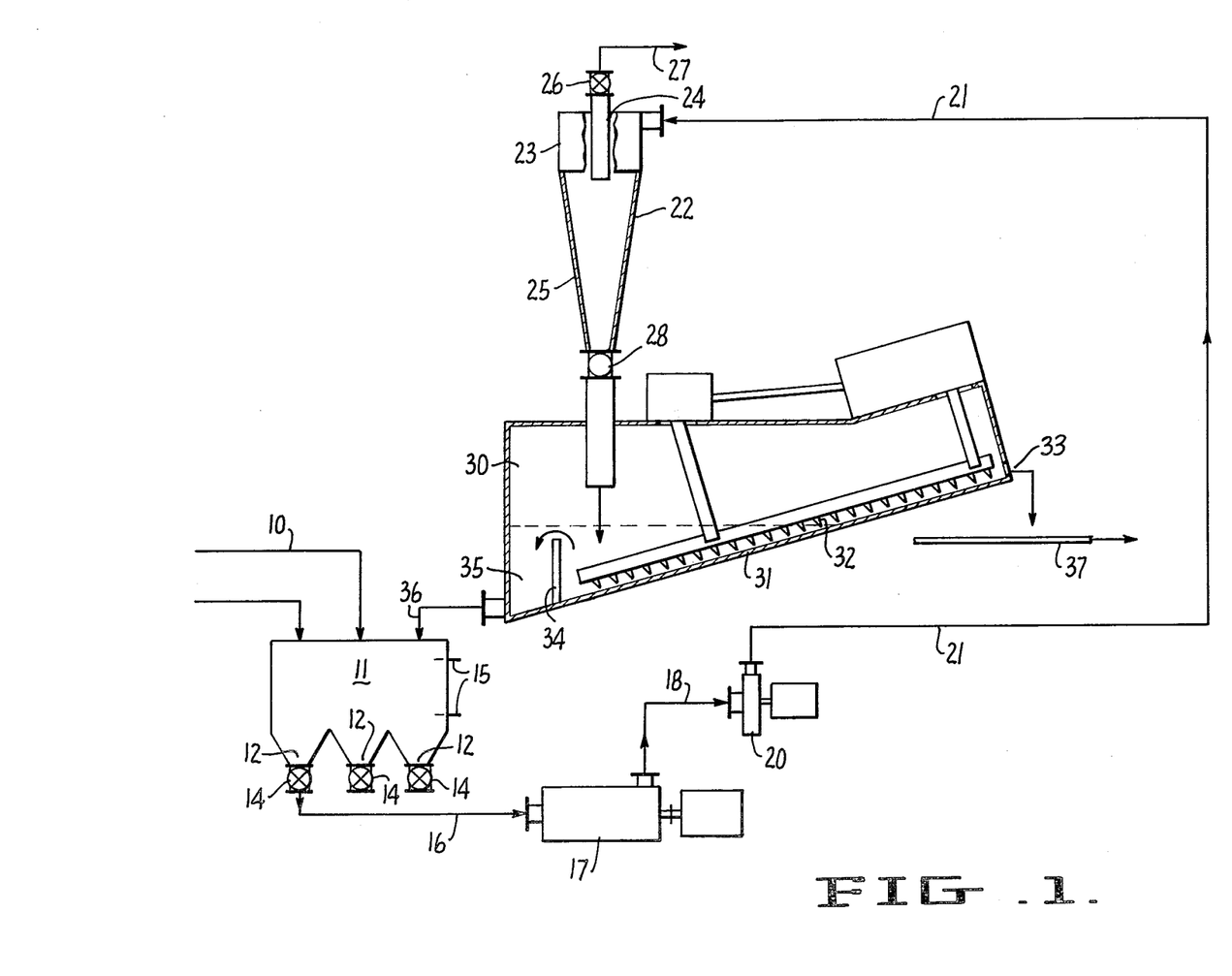
FIG. 1 is a diagramatic flow sheet for the elimination of the more easily separated sediments, generally termed "grit."

Referring now more particularly to the drawings in which like numerals represent like parts in the several views, and with particular reference to FIG. 1, this represents a diagramatic flow sheet for the first or degritting step in the treatment of raw sewage. While this description is stated with reference to the ordinary municipal sewage waste, it is equally applicable to other wastes which usually do not enter into the drainage system of municipalities.

Raw sewage enters into the system through line 10. The raw sewage in this flow is composed mainly of municipally treated tap water and/or from wells and rivers, all of which contain from 400 to 800 ppm total solids, but average about 500 ppm. To this water is added human and animal waste, paper, chemicals, vegetable matter, stone, sand, wood and a great variety of other products. This mixture contains both inorganic and organic sediments, solids and suspended solids, and colloidal suspension and solids in solution. The sediments, usually nonorganic, vary greatly in proportion from day to day as well as seasonally. Suspended solids, mostly organic in nature, average approximately between 250 and 300 ppm. The dissolved solids such as urine, detergents and the like average about 100 to 150 ppm. The solids in colloidal suspension average about 50 to 100 ppm. Line 10 feeds the raw sewage into surge tank 11 which may have several discharge outlets 12 depending upon the amount of sewage water entering the system. All discharge portions have a control valve 14 which is operated by a high and low level indicator 15 to open automatically and close the discharge valve. The discharge flow goes by line 16 to the pump-milling machine 17 such as the Dorr-Oliver "Gorator" whose function is to reduce the particle size of the intake solids into a more uniform size. The outlet from the pump-milling unit 17 goes by line 18 to pump 20. The discharge line 21 from the outlet of pump 20 feeds the hydrocyclone unit designated 22. The flow from line 21 is fed into the hydrocyclone 22 tangentially and the booster pump 20 maintains the feed at a desired constant pressure differential within this unit.

As shown, the hydrocyclone unit consists of an upper cylindrical section 23 to receive the flow. Axially downward within this cylindrical portion 23 is a tube 24 which extends just below the cylindrical portion 23. Extending continuously from the cylindrical section 23 of the hydrocyclone 22 is an elongated conical section 25. The rotation of the tangential feed constantly produces a swirling motion which sends the heavier sediment and grit outwardly by centrifugal action to the inner surface and along the inner face of the conical portion where it moves gradually downward within the conical chamber. The liquid portion containing suspended solids and of a lighter specific gravity is continuously drawn up into the pipe 24 through valve 26 into discharge line 27. The sediments are withdrawn through valve 28. It will be noted that the liquid pressure is constantly and continuously maintained by the control valves 26 and 28.

The greater the velocity within the hydrocyclone 22 and the greater the pressure, the more the separation between liquid and suspended solids. To obtain the maximum solid liquid separation a plurality of varying sizes of hydrocyclones may be used in series. The characteristics of hydrocyclones are well known and a careful choice of hydrocyclone systems should be made to obtain a desired result of particle size discharge, taking into consideration specific gravity differentials. Hydrocyclones have no moving parts, require little maintenance, and are highly efficient in the separation of solids from liquids, performing this step instantly and continuously.

As stated above, the purpose of the hydrocyclone 22 is to remove the inorganic sediments which are generally termed "grit." The grit and some of the suspended solids are discharged into a classifier 30 (a number of different existing types may be used) which is a tank with an inclined bottom 31. Over this slanting bottom 31 is a moving rake arm 32 which, with a rotating action, propels the deposited grit upwardly to the discharge point 33. A weir 34 controls the level of the liquid containing suspended solids and allows them to spill over the top into a discharge compartment 35. In this manner, the liquid and its suspended solids are returned via line 36 to the sewage tank 11 for further processing. The grit discharged from outlet 33 is conveyed in any suitable manner such as conveyor 37 for disposal as totally waste product.

For the treatment of industrial waste water the system, as outlined in FIG. 1, may be optional depending on particle sizing and chemical constituency. A simple screening may suffice.

Figure 2:
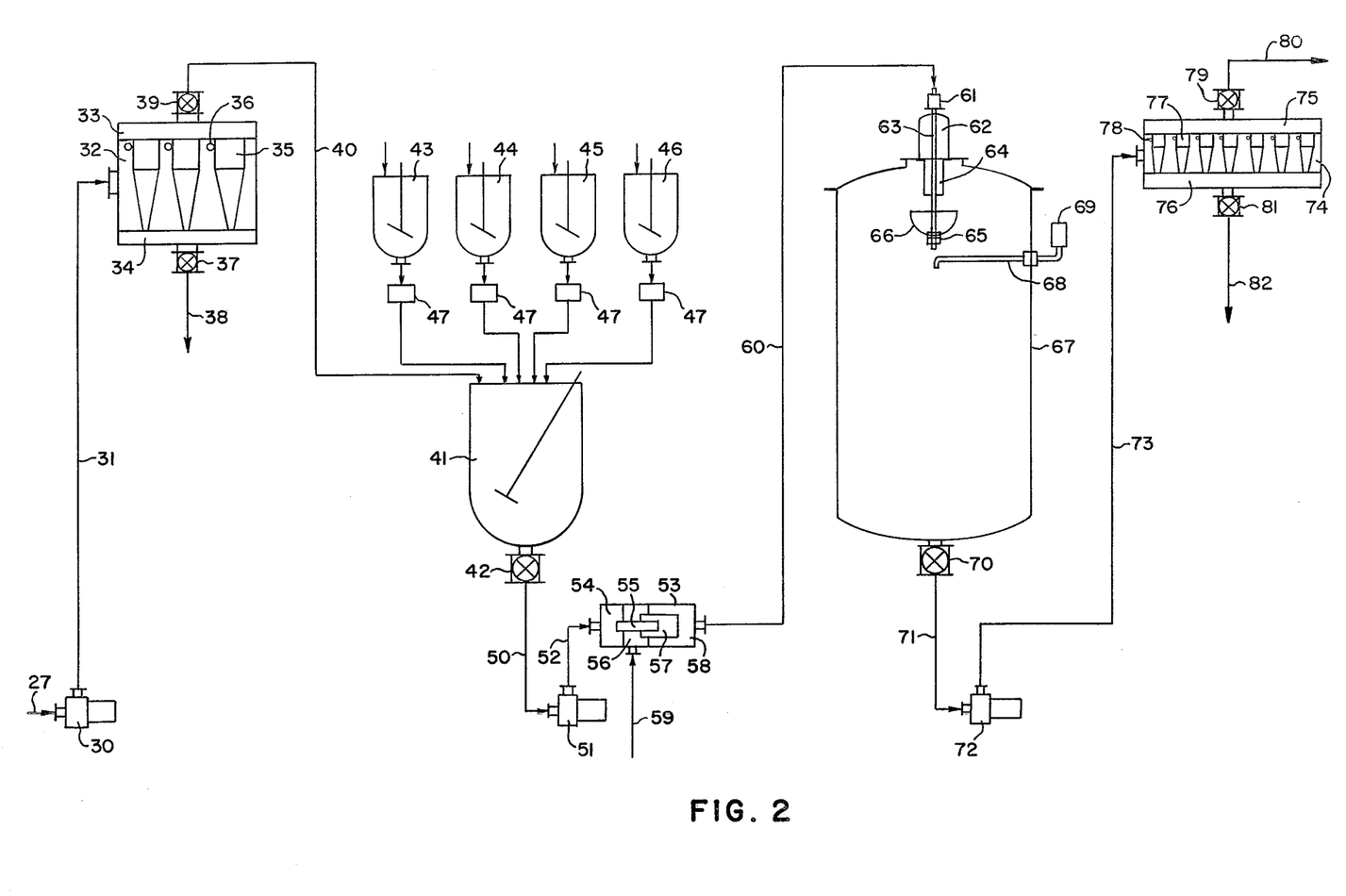
FIG. 2 is a continuation flow sheet from FIG. 1 in which the suspended and colloidal solids are eliminated from the main flow, and the treatment of the flow, with solids removed, with ozone for the purposes of producing chemical oxidation reactions to cause flocculations, precipitations, gasifications and sterilization.

FIG. 2 is the diagrammatic flow for the removal of suspended solids, the addition of chemicals, and the ozone treatment of the flow to cause flocculation, precipitations, gasifications and sterilization by oxidation and the removal of these from the flow.

The sewage or industrial waste water from which the grit has been removed is conveyed by line 27 from FIG. 1 and fed into a high pressure pump 30 in FIG. 2 through line 31 into one or a multiple number of hydrocyclones arranged in parallel and/or in series for the purpose of removing all suspended solids with particle size greater than 20 microns (0.00007874 inch). The diagram in FIG. 2 shows a number of such hydrocyclones arranged in a single housing consisting of three chambers, although other arrangements may also be made without the use of a single housing, where the liquid enters the chamber 32 wherein each hydrocyclone has a tangential opening 36 through which the liquid flows into the body of the hydrocyclone causing an intense swirling (eddy current) in the hydrocyclone producing centrifugal forces which separate the suspended solids from the liquid by the differences in their specific gravity. The clarified liquid passes centrally through an orfice into chamber 33. The separated solids are centrifugally thrust against the surface of the conically shaped base of the hydrocyclone into chamber 34. The differential pressure between intake and discharge of the liquid, the amount of liquid passing through, and its velocity determine the extent of particle size and separation of the solids in the hydrocyclone. Although the design and construction of the hydrocyclone inherently determines the various variables, these may be partially controlled by valves 37 and 39.

The liquid passing through valve 39 and line 40 to the mixing tank 41 is free from suspended solids having particle sizes greater than 20 microns, and will contain one or more different solids in solution. Holding tanks 43, 44, 45 and 46 are the metering devices. 47 represents chemicals in solid or liquid form which, when added to the waste water in tank 41, will produce one or more desired chemical and physical effects, either to assist in the further oxidation treatment, for example to change valence, pH (hydrogen ion concentration), act as a catalytic reactor, and/or cause flocculations, precipitations and gasifications.

The waste water in tank 41 with or without chemical additives is released through valve 42 and line 50 to a high pressure pump 51 which discharges through line 52 to an ozone and liquid premixing eductor; which is an apparatus through which a liquid is forced through an orifice at a high velocity into a venturi thereby producing a negative pressure area (vacuum) whereby another liquid or gas can be intimately mixed with the main liquid flow. The liquid from tank 41 enters the high pressure area of the eductor 54 and is forced through a narrow tube (orifice) 55 into a larger tube (venturi) 57 into a discharge tube (chamber) 58, thereby creating a vacuum (negative pressure) in chamber 56, which is connected to line 59 which is attached to an ozone generator. The highly concentrated ozone gas in air (oxygen) is introduced into the eductor and intimately mixed with the waste water from tank 41.

Ozone is the most powerful oxidizing agent known to man. Ozone is generated by passing dry air or oxygen ($O_2$) through an intense electric field (corona) which causes ionization of the gases, and the oxygen molecule ($O_2$) receives an additional oxygen atom to make a molecule of ozone ($O_3$). Ozone is a high unstable gas which easily reverts back to oxygen. However, the loosely bound ozone atom ($O_3 \rightarrow O_2 + O$) has a great affinity to enter into and change the molecular structures of a very large variety of oxidizable organic and inorganic substances. Ozone is soluble in water and produces an oxygen anion which causes the chemical oxidation reactions when in the presence and contacting oxidizable ions (oxidizable matter in solution). When no oxidizable matter is present in the solution, the oxygen atom combines with another oxygen atom to form molecular oxygen ($O_2$) ($2\ O_3 \rightarrow 3\ O_2$).

Usually, 1 to 1.5 parts by weight of ozone is required to cause complete oxidation reactions of one part by weight of oxidizable matter, but only a small fraction of this amount is required to cause complete sterilization. Production of ozone requires from 6 to 12 KWH of electricity to produce one pound, depending on the equipment used. Therefore, from an economical point of view, it is essential to remove as much of the suspended solids as possible from the liquid before treatment with ozone.

Because of the unstable nature of ozone and its readiness to reconvert into oxygen, it is necessary that the free oxygen atom (anion) find and contact the molecules of the substance to be oxidized as quickly as possible. To this end, the ozone must be thoroughly and rapidly mixed with the effluent to be treated so that the ozone is brought into solution and made to contact the oxidizable molecules in the liquid.

When ozone is under pressures greater than 10 psi, there is a substantial reconversion rate into oxygen; therefore, the ozone discharge from the generator should be kept at pressures below 10 psi: the reason for the use of an eductor or pump which will maintain the negative pressures required within the generator, and prevent pressure build ups.

The extremely corrosive nature of ozone on metals and many plastics requires that the contacting surfaces be coated or manufactured from polyvinyl-chloride (PVC), polytetra-fluiro-ethylene (Teflon), poly-vinylidene-fluorite (Kymar), ceramics or glass.

In FIG. 2, the waste water containing ozone is pumped through line 60 through a rotating union 61 down the hollow shaft 63 of a high speed electromotor 62 with support bearings in the housing 64. The lower end of the hollow shaft 63 is perforated to allow the liquid to pass through horizontally at which point it is attached to a hubbing device 65 containing passages for the liquid to enter at the bottom and centrally of a hemispherical cup 66 (rotary atomizer) which is held to the hollow shaft by the hubbing device 65. The rotary atomizer 66 is not confined in design to a hemispherical cup, although this is the preferred embodiment, but other shapes like discs, or fan-like devices or other shapes may also be used. The rim speed of the cup 66 can vary from 10,000 to 60,000 feet per minute depending on requirements, but the most effective speed is about 22,000 feet per minute. The objective of this device is to allow the liquid now containing ozone gas, air and ozone in solution to be pressed in a very thin layer of micron thickness against the sides of the cup progressing upwardly with increasing greater pressure (force) to the rim of the cup where the liquid is horizontally ejected with enormous force and velocity so that when the liquid contacts the atmosphere, it will shatter into tiny particles like a cloud or mist.

This cloud or mist is contained in a totally enclosed chamber or reaction tank 67 of sufficient diameter to allow the cloud to form without immediately impacting against the sides of chamber 67, and of sufficient depth to allow the liquid to accumulate at the bottom of the tank to provide sufficient retention time for the chemical oxidation reactions to be completed. The chamber has a vent pipe 68 connected to a relief valve 69 so that the pressure within the chamber will not exceed 10 psi. A controlling discharge valve 70 is provided so that the liquid in the chamber can build up and be withdrawn at the required rate.

The purpose of the liquid treatment within chamber 67 is to disperse the liquid into tiny droplets which are temporarily suspended in the ozone filled environment. The surface area of the liquid which is in contact with the ozone is vastly increased to its maximum. Because of this intimate contact between the liquid and the ozone, the oxygen atom (anions) can readily oxidize components in the liquid. The resulting chemical oxidation reactions change the molecular structure of such components to cause precipitations, gasifications, and sterilization. The pressures, dispersion and impacting all assist in the oxidation reactions by providing a more intimate contact.

The liquid accumulated in the lower portion of the reaction tank 67 contains some of the original suspended solids of less than 20 micron particle size, the precipitations caused by the oxidation reactions on the dissolved solids and gases formed by the chemical reactions, some quantity of which will be vented through the relief valve 69, and some remaining dissolved ozone which will readily form oxygen and dissipate into the atmosphere.

The liquid from the reaction tank 67 passes through valve 70 and line 71 into a high pressure pump 72 and line 73 into one or more very small diameter hydrocyclones arranged in parallel, 77, similar to the previous series of hydrocyclones, but capable of removing all suspended solids of less than 5 micron particle size (0.00001575 inch). The liquid passes through tangential orifices 78, the clarified liquid flows into chamber 75, and the liquid containing concentrated solids flowing into chamber 76. The sludge from 76 contains about 20% solids and flows through pressure control valve 81 to line 82. The clarified liquid flows through chamber 75 and through pressure control valve 79 into line 80. The clarified liquid will be completely sterilized without any living microorganisms and completely deodorized. The water will be harmless to any biological life. When desired, further purification of the water can be attained by filtration, reverse osmosis, or electrodialysis.

Various methods of dissolving ozone in water are being used: (1) bubbling ozone into the water by means of perforated piping or porous diffusers. This method provides very little contact between the ozones and the molecules of oxidizable matter to cause extensive oxidation reactions as the mass of water is large compared to the surface area of the water in contact with the ozone. (2) By spraying the water through nozzles into an ozone filled environment. To obtain the fine dispersion of water, tiny orifices must be used with very high water pressures and even very small particles of matter can clog the nozzles. Furthermore, the water droplets are much larger than those obtained by rotary atomizers. Such nozzles cannot disperse sludge solids. (3) Injecting ozone into eductors or the suction side of centrifugal pumps. This method is effective, but the contact area between the mass of liquid and ozone is limited. This disclosure uses an eductor or pump injection method only as a preliminary mixing procedure followed by the rotary atomization of the liquid and ozone.

FIG. 3 diagrammatically represents the flow and treatment of sewage sludge in order to destroy all living microorganisms (sterilization) and make the product oder free for further processing into fertilizer. Although sufficient ozone can chemically alter and destruct most of the solids in the sludge, this is not the aim of this treatment as the product can more productively be used as fertilizer. Sterilization only requires a very small quantity of ozone compared to that required for total oxidation reactions.

The sludge from line 38 and line 82, FIG. 2, containing about 20% suspended solids, is fed into a low pressure pump 90 through line 91 into a sludge holding tank 92 with a control valve 93. The sludge passes through the control valve 93 and line 94 into which is fed ozone gas and air into the suction side of a centrifugal pump 96. The use of a centrifugal pump to dissolve ozone into the sludge is another method of the use of an eductor for preliminary mixing, and either method can be used. However, the preferred embodiment is the use of an eductor with a high pressure pump as shown in FIG. 2, because the eductor provides a better negative pressure to the ozone gas, and does not impede the flow capacity of the liquid with the introduction of the gas, while such a flow of gas into a centrifugal pump system diminishes its pumping capacity.

The pump 96 conveys the liquid sludge mixed with a controlled amount of ozone to the reaction tank 104 through the rotary atomizer in exact duplicate as that described in FIG. 2.

Figure 3:
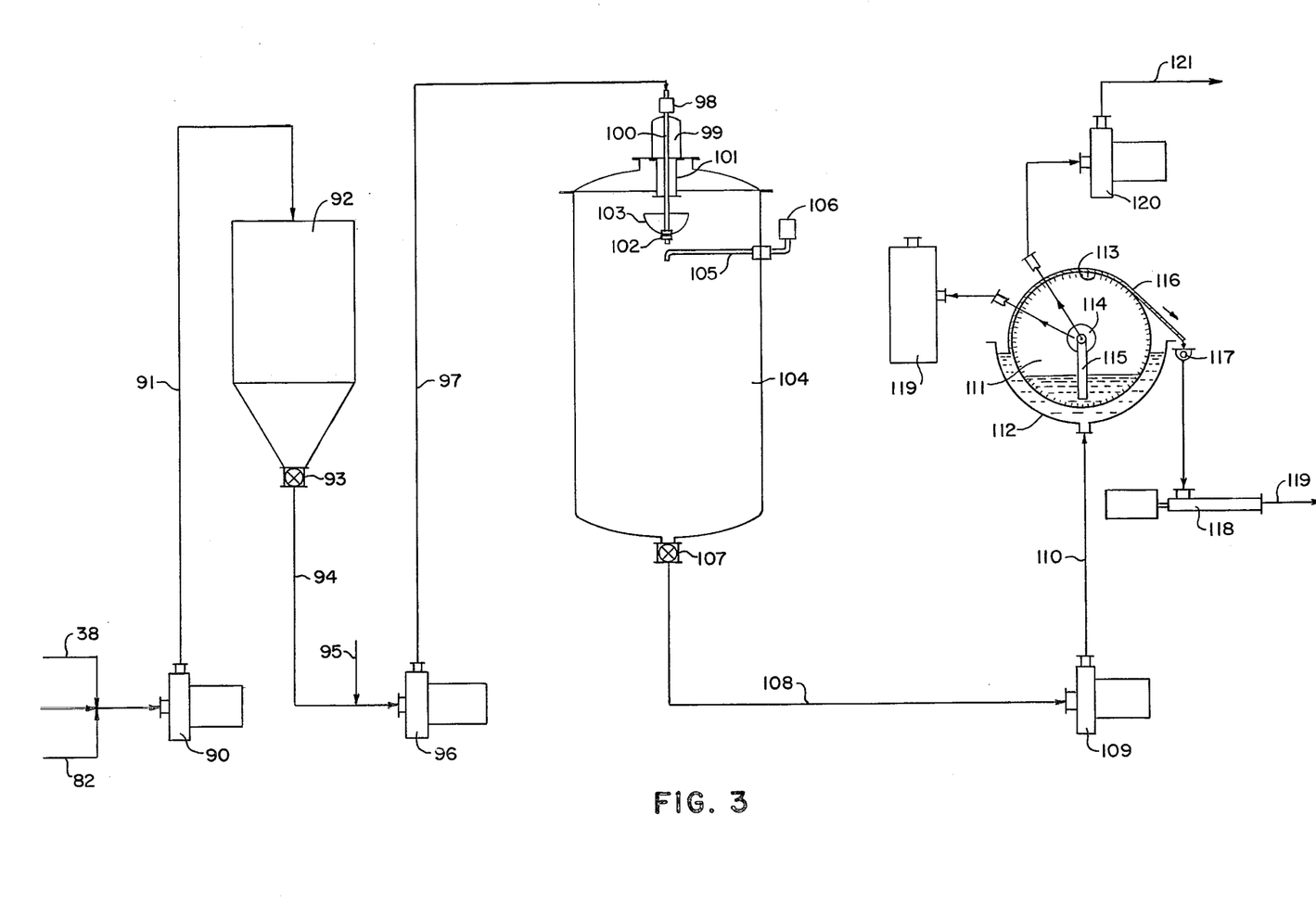
FIG. 3 is a continuation diagramatic flow sheet for the treatment of solids with ozone for sterilization and treatment of the remaining sludge.

The physical function and chemical reaction effect differs from that described in FIG. 2 within the reaction tank 104. The solid particulates trajected from the rim of the atomizer cup, having a much greater specific gravity than the liquid, acquire a greater kinetic energy which causes the suspended solids to separate from the liquid while in trajectory. The suspended solids will tend to impact the sides of the chamber and in a thin film travel downwardly along the sides to remix with the liquid accumulating in the lower section of the chamber, while the liquid will shatter into a cloud or mist and float downwardly to accumulate in the lower section of the tank. This entire process takes place in an ozone filled environment causing intimate contact between the solids and liquids and ozone, thereby creating an oxidation reaction to cause sterilization of the solids and liquids.

The sterilized and deodorized sludge containing about 20% solids is discharged from reaction tank 104 through a control valve 107 and line 108 to a pump 109 and through line 110 to any type of filtration system; but the preferred embodiment is a continuous vacuum filtration device, as shown in FIG. 3, which generally consists of a liquid holding tank 112 through which rotates a perforated drum 113 supported by a perforated hollow shaft 114 through which a negative pressure is obtained by a vacuum pump 119 in the interior chamber of the drum 111. Through the same hollow shaft a pipe is drawn with a vertical extension thereof, 115, which remains submerged in the liquid which is being continuously drawn through the perforated drum by vacuum and is attached to pump 120 to draw out the liquid into line 121 for conveying into sump tank 11 in FIG. 1 for reprocessing.

The perforated drum 113 is usually covered with a filtering screen on which is predeposited a thin layer of filter aid. The solids are retained on the screen while the liquid passes through the screen by virtue of the negative pressure in the drum chamber 111. The sterilized and deodorized paste-like filtered sludge solids 116 now contains about 50% moisture and is scraped off the drum surface and enters a conveying device 117 to a sludge pump 118 and through line 119 for further processing.

The further treatment is with reference to FIG. 4. The sludge solids composed mainly of organic matter derived from human waste and vegetable matter, contains from 3% to 5% phosphorus ($P_2O_5$), and about 3% potassium ($K_2O$) when composted.

Biological life requires nitrogen, phosphorus and potassium, and traces of many other elements to sustain its reproduction and growth. The decomposition of organic matter is caused by enzymatic systems brought about by the growth of microorganisms, which in turn produce the enzymes to decompose the organic matter for food of the microorganisms. Unfortunately, this essential element in the ecological life cycle, namely the growth of microorganisms in the soil, has been grossly neglected in the modern system of agriculture which uses more and more chemical fertilizers to sustain decreasing yields and nutritional deficiencies. As plant life weakens, insect life increases. Pesticides are used to destroy the insects, but unfortunately these same pesticides also kill microorganisms. One can reasonably anticipate the eventualities and the far reaching results. Accordingly, it has been discovered that by using the solids of this process, the soil can be revived to provide the growth of microorganisms and the restoration of biological life. Special strains of microorganisms are developed and incorporated into a formula which includes certain organic chemicals that combine to produce a genetic environment enhancing the growth rate of microorganisms and plant life.

It has been discovered in this invention that the key to composting organic matter to make a fertilizer is to maximize the number of microorganisms in the compost, and not reduce the organic matter to a humus-like ash. This requires stopping the decomposition of organic matter when the microorganism count has reached its maximum, and then dehydrate the same at low temperatures of not more than 130° F. so as not to destroy the enzymes and to hold the microorganisms in spore form. This will allow the microorganisms to retain their initial food environment, enabling them to acclimatize to the new food environment of the soil, thereby increasing their activity rapidly to produce the necessary plant food.

The replenishing of the soil with microorganisms not only assists in the decomposition of organic matter in the soil, but also in the breaking down of the excessive chemical fertilizers, and some of the pesticides, into harmless chemicals. Continued use of the additional microorganisms and composted organic matter will accelerate this action and hopefully restore the soil to its original productive state. To accomplish this result, a percentage of trace elements and chemical fertilizer is added to the organic solids. For example, enough chemical fertilizer is added to make a ratio of 8:5:3 of nitrogen, phosphorus, and potassium, including 5% of veined trace elements.

With reference to FIG. 4, the slurry in line 119, FIG. 3, is conveyed by the slurry pump 118, FIG. 3, to a mixer 181 capable of handling heavy sticky material in such a manner as to cause the additives to be thoroughly integrated. As the solids have been sterilized so as to destroy all pathogenic microorganisms, new nonpathogenic composting microorganisms are added (186) preferably those specially prepared according to the formula as outlined in this invention. Preferably, the microorganisms are in a dehydrated spore form held in a holding tank 186 and metered out by a metering system 187 into the mixer 181. For example, at the rate of one pound of dehydrated microorganism mix per 10,000 pounds of dry solids.

The sticky solids containing at least 60% moisture cannot be properly dehydrated in this form, but only when the product is more friable. To make this product more friable, previously dehydrated and composted solids 200 are fed back by means of a conveying system 183 through a surge tank 185 and a metering device 188 into the mixer 181 and thoroughly mixed with the solids. This feed-back increases the solids content of the product, for example, from 40% to 60%, leaving 40% moisture in the product for composting and dehydration.

The destruction of microorganisms in the soil, and the continuous use of the soil, with or without rotation of crop depletes the soil of necessary trace elements required for plant growth and healthy ecological life cycles. Therefore, to obtain the highest quality of commercial fertilizer, the addition of trace elements would greatly enhance its value. Concentrated trace elements are found in certain mined minerals, and addition of these minerals to the compost fertilizer not only assists the growth of microorganisms, but also enhances the value of the fertilizer in assisting plant growth and introducing these trace elements through the plant to the animals and humans feeding on them. Healthy vigorous plants are less likely to be injured by insects, like healthy humans and animals are less likely to be injured by disease.

Figure 4:
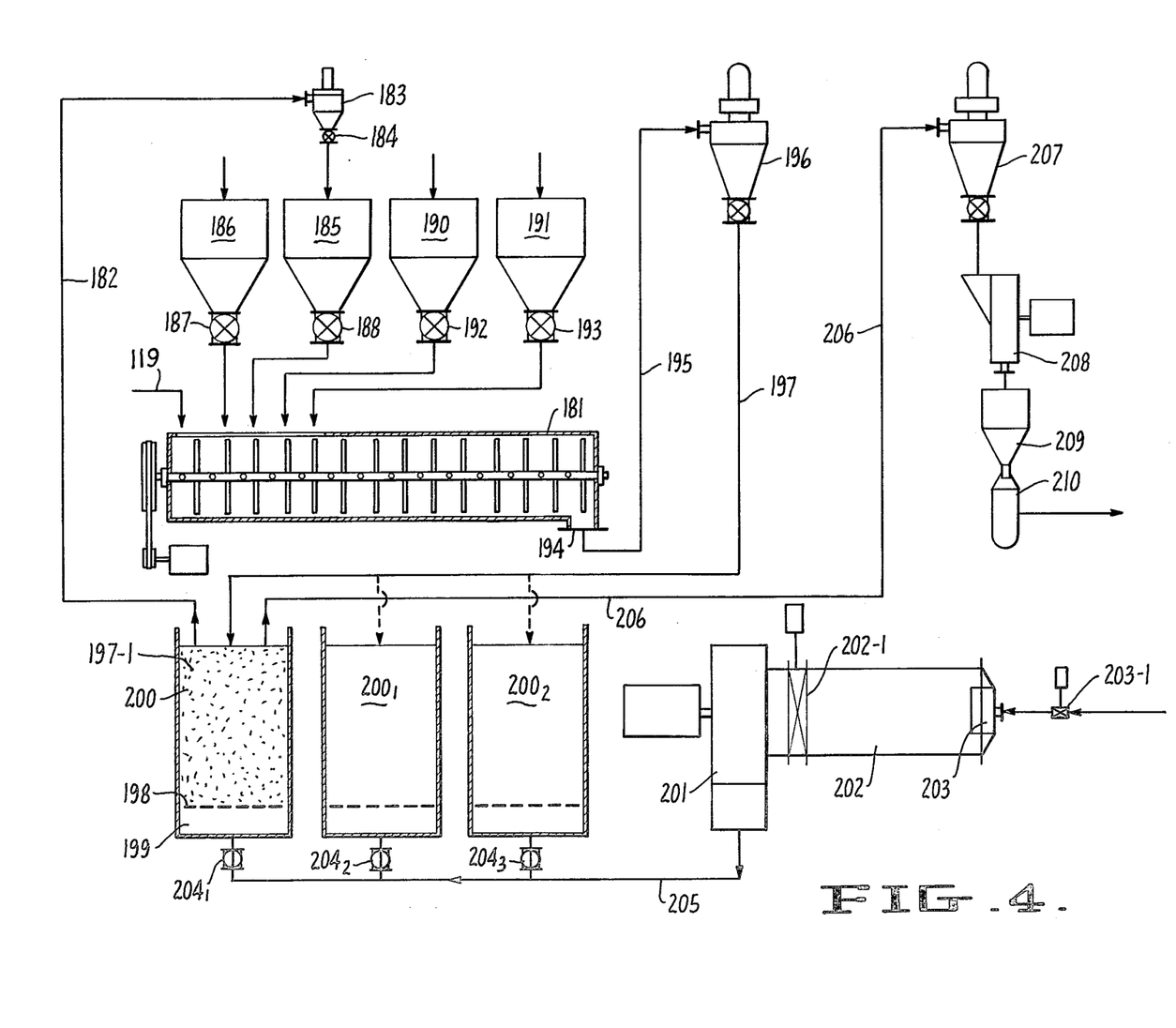
FIG. 4 is a continuation of FIG. 3 for the treatment of the solids for composting into a fertilizer showing the dehydrated feedback.

The trace elements in a dry and particulated form is fed into the mixer 181 through a surge tank 190 and a metering device 192 constituting, for example, 5% of the dry weight of the compost fertilizer. The amount of trace elements added may be that amount required to replenish the soil in consumer demand. Although eventually chemical fertilizers may be eliminated from the soil altogether with the use of sufficient compost fertilizers, the immediate withdrawl of chemical fertilizers after decades of use may cause a serious decrease in crop yields. To obtain a high quality complete fertilizer, the addition of some chemical fertilizer to the compost fertilizer would greatly increase its value and utility. As compost fertilizer already contains nitrogen, phosphorus, and potassium, only relatively small amounts of these compounds must be added to make an acceptable ratio of, for example, 8% nitrogen, 5% phosphorus, and 3% potassium, or any other ratio determined by consumer demand. The chemical fertilizer mix stored in tank 191 is composed of the requirements to upgrade the nitrogen, phosphorus and potassium content of the compost mix, and is fed to the mixer 181 through a surge tank 191 and a metering device 193 in such a proportion as to have an end product containing the required amount of these chemicals. As these are mixed into the material in bin 181, we will have a complete product which by the mixing and the control of the mix can form the best type of commercial fertilizer.

The mixed material is released at 194 and travels by line 195 into a conveying system 196 and in the finished friable form is transferred by line 197 to the compost bin 200. If residence time is required in the compost bins, they are provided in series such as $200_1$ and $200_2$. The compost bin 200 and the method of handling the product therein differs from the conventional practice in that the compost is not turned over. The object here is not to turn the product into humus but rather to obtain the highest bacterial count required for plant growth. Humus will not supply the required bacteria or microorganisms necessary for growth and without them bad soil conditions result. To this end, the compost bin 200 is heated with hot air by means of a fan 201 and a heating unit generally designated as 202. The burners 203 are temperature controlled so that the bin starts with a temperature of about 96° F. to give fast activation of the bacteria at the established temperature.

The compost pile is constructed in a box-like structure of wood, concrete or any other type of material 200, which is open at the top to allow gases to escape. This structure may be square or elongated in its length or of any other shape. The entire bottom area of this structure is spaced and separated from the remaining volume by a screen 198 leaving an open space 199 through which air can pass at an elevated pressure through a control valve $204_1$ (or $204_2$ or $204_3$). On top of the screen 198 is placed the organic material to be decomposed by microorganisms 197-1. The static back pressure or resistance to a given flow of air passing through the screen 198 and caused by the screen must always be greater than the back pressure caused by the product above the screen, (see U.S. Pat. No. 3,063,848 issued to Arthur Van Gelder, Nov. 13, 1962), so as to assure even distribution of air passing through the product, and prevent "blow-holes" which are caused by concentrated air channels through the product when the screen has back pressure or resistance less than that caused by the product on top of the screen. The air passing through the product, when the correct pressure conditions are maintained, will pass around each particle of product being treated, and when sufficient air is passed through the product (increased air velocity) to overcome the forces of gravity the individual particles being treated will move away from each other and float on the air stream, this action being called fluidization. The entire bed of product will now behave like a liquid.

The aerobic decomposition of cellulose, hemicellulose and carbohydrates by bacteria and fungi takes place best between temperatures of 68° F. to 82° F. with hydrogen ion concentrations between 6 pH and 7.5 pH in the presence of oxygen, nitrogen and carbon dioxide obtained from the air and its own decomposition. The chemicals produced by decomposition continue to feed the microorganisms and fungi and producing prolific reproduction. As the microorganic reactions increase, the temperature of the pile will increase automatically unless controlled externally. As the temperature rises the growth and chemical reactions caused by the above bacteria and fungi slows and almost ceases between 115° F. and 140° F. Between these temperatures thermophillic bacteria and fungi take over and attack the proteins (nitrogen compounds) producing ammonia gas ($NH_3$), carbon dioxide, various organic acids and alcohols. The ammonia gas is transformed into nitrates and nitrates by other microorganisms. The system is symbiotic where the chemicals produced are food for one or the other of the many microorganisms in the decomposition procedure. When the moisture level of the pile is maintained, and the temperature of the pile is externally controlled by passing warm or cold air through the pile, maximum microbial reproduction can be attained with maximum chemical reactions to produce a maximum amount of nitrates and nitrates usable by plant life. When microbial and fungal density is at its maximum, the pile is dehydrated by continually passing warm air through the pile of between 100° F. to 120° F. at an increased velocity, which temperature will not destroy the microorganisms or enzymes produced by the microorganisms. Most of the microorganisms will return to a spore form when dehydrated.

The piles 200 may represent the low temperature phase, $200_1$ may represent the high temperature phase, and $200_2$ the dehydration phase of the method. The warm air is pressurized by a fan 201, the amount of air distributed is controlled by a valve 200-1, the temperature of the air is controlled by a burner 203, firing into a chamber 202 the fuel intake of which is controlled by a valve 203-1.

As stated earlier there are ancillary compost bins $200_1$ and $200_2$ and these bins may either be used for the same compost as in 200 or for different mixtures of enzymens and chemicals. In all of them, the heat or temperature is controlled through valves $204_1$, $204_2$ and $204_3$ through line 205.

At every rise in temperature, self induced by the microorganisms or by increasing the temperature mechanically, a new type of bacteria will grow producing different enzymes and different chemicals. The temperature may go as high as 130° F. to promote the maximum growth of fungi. These fungi will disintegrate the product and produce the nutrients for the bacteria. However, at such temperatures the bacteria have stopped their growth because the temperature is too high. To again promote the growth of bacteria and microorganisms the self induced heat is now stopped and cool air is passed through the fan 201 into line 205 and a new growth of bacteria and microorganisms is fostered. These feed on the nutrients developed by the previous bacteria and as the temperature rises again within the compost there is an additional amount of nutrients developing and an additional amount of decomposition. This cycle is repeated until the temperature of the compost no longer rises above 130° F. It is at that point that the maximum amount of decomposition and the maximum amount of bacteria required for the compost has been attained. At this point hot air not greater than 125° F. is put into the compost through line 205 and the entire bin is dried at this temperature. It is noted that the heating air enters at the bottom and moves upwardly into the compost to thoroughly dry nad dehydrate the entire product. The decomposition period takes from nine to eighteen days, and therefore, a number of piles may be used, the treatment of which is each suitably controlled by valves $204_1$, $204_2$ and $204_3$. The air passing through the pile need not be continuous, and can be of varying velocities and amounts, depending on the temperature and air requirements for each phase. The dehydrated compost fertilizer is pneumatically conveyed and collected in tank 207 or conveyed by any other means and delivered to a mill 208 to produce a uniform particulated product, followed by metering and bagging equipment 209 and 210 to produce a commercial complete composite fertilizer ready for transportation and sale. To increase the bulk density of the product, the fertilizer may be pelletized or compressed. The completed process of drying reduces the moisture content of the compost from about 60% moisture to 10% moisture and the product is now considered dry and friable.

This represents one of the great advantages and flexibilities of this particular system, to wit, it can be reduced in size and equipment to operate on much smaller flows, or vice versa, without damage to the efficiency or the accomplishments obtained by the larger and more sophisticated installations. Exactly the same changes are accomplished and results obtained in this system in the smaller installations as in the full sized installations.

Such smaller installations can frequently be used as pilot plants for determining the operating characteristics required in a larger system to be subsequently installed.

It is believed that the procedures and results explained herein completely accomplish the objectives of this system, and other features which will be apparent in the installation and operation of a system following this disclosure.

What is claimed is:

1. A method of treating an effluent composed of raw sewage and other waste waters containing grit, suspended solids, semi-colloids and solids in solution, which comprises:
   (a) separating the grit, and suspended solids having a particle size greater than about 20 microns, from the effluent;
   (b) introducing ozone gas at a negative pressure from an ozone generator into the resulting effluent by premixing said ozone gas and said effluent with an eductor;
   (c) atomizing said ozone-treated effluent to form a mist in an enclosed chamber through which ozone is flowing whereby the droplets of mist are intimately contacted with the ozone;
   (d) condensing the mist to a liquid by causing the mist droplets to fall through said chamber by gravity whereby to form a liquid in the bottom zone of said chanber; and
   (e) separating from said liquid particles having a size greater than about 5 microns.

2. The method of claim 1 which comprises the further steps of atomizing a sludge containing the suspended solids of step (a), said sludge containing not more than 25% suspended solids in effluent, in an enclosed chamber through which ozone is flowing, the ozone concentration in said chamber and the contact time of sludge and ozone being such that microbial life in the sludge is destroyed without effecting substantial changes in the chemical or molecular structure of the sludge solids, and separating sludge solids from the effluent in the form of a paste-like substance containing from about 40% to 60% of solids.

3. The method of claim 2 wherein the said atomizing of the ozone treated effluent is effected by feeding the effluent into a hemispherical cup or bowl rotating at a rim velocity of from about 10,000 to 60,000 feet per minute.

4. The method of producing fertilizer which comprises mixing the paste-like substance containing from about 40% to 60% solids of claim 2 with nonpathogenic, aerobic composting soil microorganisms, adding thereto nitrogen, phosphorus, and potassium compounds, positioning the thus-enriched said product on a perforated support forcing air upwardly through the product for a time and at a temperature such that maximum microbial growth of each type of microorganism occurs without physically disturbing the microbial colony growth, continuing passing air through the product and dehydrating the product when maximum microbial count has been attained.

5. A method of producing fertilizer which comprises positioning the paste-like substance containing from about 40% to 60% solids resulting from the method of claim 2, in a container having a perforated bottom and open top, to a depth of about four to six feet, forcing therethrough air which is at a temperature between 68° F. and 82° F. for a time such that the microorganisms in the sludge grow while the temperature of the sludge increases to about 130° F., introducing cooler air under pressure whereby to lower the temperature of the composting sludge to between 68° F. and 82° F., and repeating the cycle until the sludge compost temperature can no longer rise above about 120° F., the sludge compost being maintained at a moisture content of not less than about 30%, and introducing air at 120° F. into the product at a maximum velocity of not more than 600 feet per minute until the moisture content is lowered to not more than 8%.

6. The method of claim 1 wherein the said atomizing is effected by feeding the effluent into a hemispherical cup or bowl rotating at a rim velocity of from about 10,000 to 60,000 feet per minute.

7. The method of claim 1 wherein the enclosed chamber is substantially cylindrical, is positioned on end, has a rotary atomizer suspended at the top and within the chamber, and is sufficiently long to allow the formed mist, as it descends through the chamber, to dissolve ozone therein for at least 10 minutes.

8. The method of claim 7 wherein the pressure in the chamber is maintained at less than about 10 psi.

* * * * *